United States Patent [19]
Graham et al.

[11] 3,941,936
[45] Mar. 2, 1976

[54] TELECOMMUNICATION SYSTEM USING TDM SWITCHING

[75] Inventors: Keith Graham, Kitchener; Viacheslav Korsky; Christopher Elmer, both of Guelph, all of Canada; Edouard Pinede, Norwalk, Conn.; John Litster, Guelph; Jan Aarts, Kitchener, both of Canada

[73] Assignee: International Standard Electric Corporation, New York, N.Y.

[22] Filed: Oct. 4, 1974

[21] Appl. No.: 512,061

[30] Foreign Application Priority Data
Oct. 19, 1973 Canada .............................. 183674

[52] U.S. Cl. ........ 179/15 AT; 179/18 J; 179/18 EB
[51] Int. Cl.² .......................................... H04J 3/00
[58] Field of Search ........ 179/15 A, 15 AT, 15 AQ, 179/18 J, 18 EB, 18 ES

[56] References Cited
UNITED STATES PATENTS

| | | | |
|---|---|---|---|
| 3,524,946 | 8/1970 | Pinet .................................. | 179/18 J |
| 3,673,340 | 6/1972 | Casella ............................... | 179/18 ES |
| 3,676,855 | 7/1972 | Tallegas ............................. | 179/18 J |
| 3,710,029 | 1/1973 | Grossman .......................... | 179/18 J |
| 3,787,633 | 1/1974 | Busch ................................. | 179/15 AT |
| 3,819,865 | 6/1974 | Weber ................................ | 179/15 AT |
| 3,838,226 | 9/1974 | Warman ............................. | 179/18 J |

Primary Examiner—Ralph D. Blakeslee
Assistant Examiner—Joseph Popek
Attorney, Agent, or Firm—James B. Raden; Marvin M. Chaban

[57] ABSTRACT

A telecommunications system using TDM principles for signalling and speech path usage plus PAM principles for speech transmission. Each function circuit such as a trunk, link or register, etc. is allocated a basic time slot or channel for initiation of its function when indicated. The active period of each function circuit is continued during the period of three succeeding time slots. In this way, up to four function circuits or channel units may be active during a finite period of time.

In the system, a line is scanned at the end of each complete scan of all channels, thereby lessening the complexity of associating a line and a function circuit. The system shown uses the dual highway principle for its speech path and provision is made in each line circuit for switching onto both highways.

12 Claims, 13 Drawing Figures

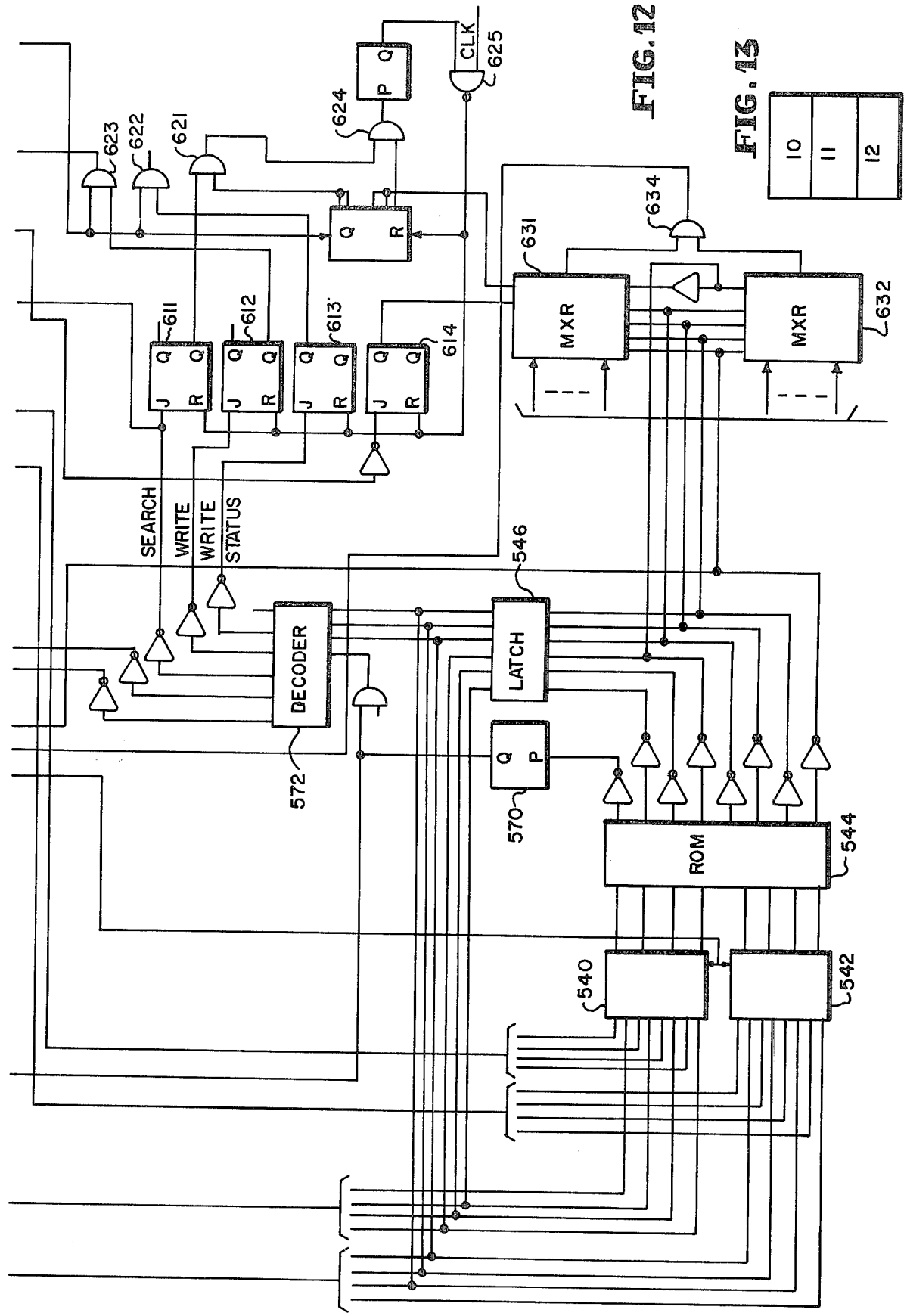

TELECOMMUNICATION SYSTEM USING TDM SWITCHING

BACKGROUND OF THE INVENTION

Telecommunications systems employing time division switching are, of course, well-known in the art. Such systems have employed many different approaches, the most prevalent being those which allocate each time slot to a conversation path. Where systems assign a time channel to each function circuit, all activities relative to the call in process over a channel are generally consummated during that channel period. Frequently, this processing is accomplished by subdividing the channel period into individual sub-periods for each step in the sequence. Thus, the duration of each time slot must be lengthened to provide the serial transmission of data.

Other systems combine both time division and space division to provide sufficient time slots and line capacity. Still other systems employ a single closed loop and transmit information on the loop only as from one line to another line, each line having a fixed time slot appearance on the line.

Within the general framework of TDM switching, either one of two basic approaches have been used, these being the single highway and the dual highway approaches. With a single highway, allocation of channels for each direction of transmission is necessary while the dual highway provides unidirectional flow of information with the necessity of synchronizing and maintaining synchronization of channels.

SUMMARY OF THE INVENTION

The invention relates to a telecommunication exchange using time division switching and PAM speech transmission. Any known PAM approach may be used herein. The present system is a dual highway system in which one highway is used for the receipt of message information and the other is used in the transmission of message information.

Within the system all function circuits or talking circuits such as registers, local links, C.O. trunks, and special features circuits are permanently assigned individual time slots or channels. Thus, only the addresses of the calling and called parties need be stored in the time slot for a call in process. A final time slot in each time slot frame is assigned to the line-scanning function.

Each time slot as assigned to a function circuit may be considered a basic time slot with one function occurring during the basic time slot. Each function circuit employs in total four time slots, three subsequent to the basic slot. During a basic time slot, such as time slot No. 1, information is fed or transferred into the processor for function circuit No. 1. During the next time slot (time slot No. 2), information is processed for circuit No. 1 while information regarding function circuit No. 2 is being transferred in. During the next time slot, information is transferred in for function circuit No. 3, information is processed for circuit No. 2 and information is decoded or processed further for function circuit No. 1. During the fourth time slot, information is transferred in for the circuit No. 4, processed for circuit No. 3, decoded or processed for circuit No. 2 and the call condition or status is re-stored in the memory for circuit No. 1. In this way, each function circuit is acted upon during four time slots, the added slots being disposed adjacent the basic time slot for that circuit. Up to four function circuits may be involved independently in call processing during a particular time slot.

Within each line circuit is provided switching capability for each of the dual highways. Actual switching of the highway connections at a line circuit is performed by FET devices, with logic controlling the FET devices. Each line circuit thus has four FET's, one for origination and one for termination on each highway. The state of the FET's is stored in the logic so that busy testing may be performed by interrogating the logic.

The system is controlled by an electronic control processor which receives data from a plurality of function circuits in parallel, there being up to eight data bus leads per time slot (status and identity).

Thus, it is an object of the invention to provide a new and improved local telecommunications exchange using TDM principles.

It is a further object of the invention to provide a telecommunications exchange using TDM principles in which the time slots are assigned to specific individual function circuits such as links, trunks and conference circuits.

It is a still further object of the invention to provide a telecommunications system using TDM principles in which each time slot is assigned to a particular operational circuit and in which the circuit is active during a plurality of time slots to receive information in parallel form.

These and other objects, features and advantages of the invention will become apparent from the detailed specification viewed in conjunction with the drawings described briefly.

BRIEF DESCRIPTION OF THE DRAWINGS

FIGS. 10–12 form a schematic circuit diagram in greater detail of the central processor of FIG. 1; and FIG. 13 is a block diagram of the location of FIGS. 10–12 relative to one another.

DETAILED DESCRIPTION OF THE DRAWINGS

Figure 1:
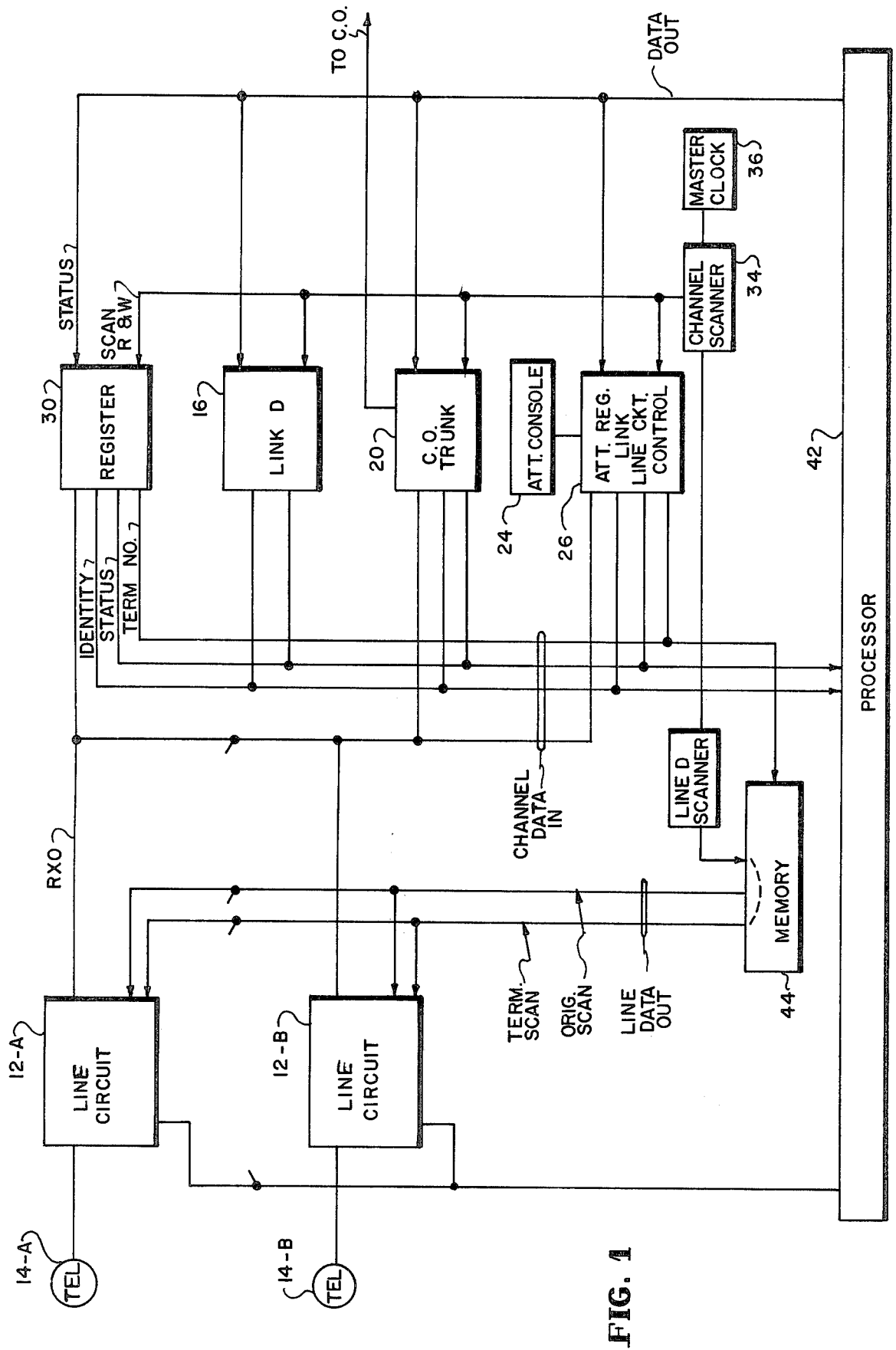
FIG. 1 is a schematic block diagram of the system using our invention.

In FIG. 1, we show a block diagram of a telecommunications system designed to service up to 100 lines in the form of a local PABX. Each line has a line circuit 12 interconnecting between the exchange and the telephone stations on that line. Two such line circuits are shown, each with one telephone station, the stations being indicated by circles denoted by reference numeral 14A and 14B.

As is conventional, there are provided a plurality of local links 16 (only one of which is shown) for completing and supervising local calls. In one exemplary system, up to twelve local links may be provided. For calls to and from a remote central office, one or more central office (C.O.) trunks 20 are provided, the number of such trunks provided being dependent on the grade of service to be provided between the local exchange and the central office. In addition, tie lines may be provided (none being shown) and preferably the number of tie lines and C.O. trunks should not exceed twenty-four in total within the exemplary embodiment described.

An attendant position or console 24 may be provided, the console having connected thereto including at least one local link, line circuit and control circuit along with a register, these being collectively identified by the numeral 26. The functioning of the attendants console and C.O. trunk will not be described in detail herein, as not being necessary to the understanding of the general principles of the system.

Also shown in FIG. 1 is one register 30 which is used to register called station information as will be described. As many as four registers may be provided in the system shown.

The present system uses TDM principles and provides 64 time slots, each time slot being of one microsecond duration. With a system comprised of 64 time slots per frame or cycle, a complete time slot or channel scan cycle of channel scanner 34 as controlled by master clock 36 occurs in 65 microseconds. One line is scanned during the final time slot of each channel scan frame by a line scanner 40, so that a full line scan of the one hundred lines of the system occurs in 6.4 milliseconds.

In the system, all talking or function circuits such as trunks, registers, local links, conference links, paging circuits, etc. are considered to be channel units and are assigned a time slot. There are sixty-four of these time slots; however, only a maximum of 62 may be used for speech-carrying circuits and one slot is used for line scan. Thus, the maximum number of function circuits is 62.

Within the system, most of the interconnection of the function circuits to the central processor 42 is by the use of common data bus leads connecting the control processor 42 to the various channels. These circuits generate their own identity code by strapping, and therefore, circuits of the same physical size can be plugged into like positions, i.e., a trunk can be inserted into a tie line and function properly as a C.O. trunk. As the positions are assigned one, three or four time slots each, care must be exercised in choosing the required positiion. However, a four-link board inserted into a three-time slot position, will allow three links to be operational.

The master clock 36 controls two scanning functions, the first being the channel scanner 34 which scans the channels sequentially and after a complete scan, increments the line scanner 40 by one to cause a line to be scanned during the last slot of each frame.

Each channel when scanned transmits data in a parallel format to the control. This data comprises: (1) The channel identity; (2) Status of the channel (free, busy, etc.); and (3) Station number (in the case only of registers).

The central control (processor) 42 processes data received from the function circuits, the memory 44, and from the register, and returns data, if required, to the channel two time slot periods later, i.e., data read out on channel No. 1 will be returned to channel No. 1 during the read period of channel No. 3.

The purpose of the line scan is primarily to process "requests for service" from a station. On receipt of a request, the number of the calling line is stored in the memory and transferred to a free register to connect the line circuit to a channel. Subsequent line scans past that number no longer comprise requests for service, as a busy indication is now provided.

Data is transferred from the function circuits to the processor 42 and memory 44 in coded form (the processor and memory jointly forming the common control) over a plurality of bus leads, the bus leads being common to the function circuits and entitled "Channel Data In" in FIG. 1. This data comprises identity leads, status leads and terminating number data, using four leads for identity, four leads for status and four leads for hundred numbers, four leads for tens numbers and four leads for units. Data from the control to the function circuits is sent in uncoded form on twelve input leads symbolically shown in FIG. 1 by one lead entitled "Data Out". From the memory to the line circuits data is sent over the leads labeled "Line Data Out".

On a call being originated, and found by the line scan, a register is activated during the next time frame to process that call. The register remains in the call processing mode until all digits are received and analyzed. If the call is a local call, three digits are dialed and the digits are stored in the register. A busy test of the called line is initiated, and the register is dropped once an idle called line has been found. A link is activated to supervise the call once an idle line has been found.

A station-to-station call may be traced as follows: Assume station 14A is calling station 14B. When station 14A goes off-hook, the Line Circuit 12A, a signal on the originate scan output lead to the Processor is routed to the Memory and to a line scanner which determines the number of the calling station and stores the number. A proper free or busy signal to the processor indicates the line circuit is now busy.

The processor causes an idle register to be transferred to control the call and applies a dial tone enable signal to the Common Services, which applies dial tone to station 14A via the RxO path of the common highway and line circuit 12A of station 14A. Dial tone is routed to the common highway and to station 14A only during the time slot allocated to the register (one microsecond every sixty-four microseconds). The units and tens outputs of the memory, corresponding to line 14A, along with a receive enable signal, enables line circuit 12A of station 14A.

When the dial tone is received, the three-digit station number of called station 14B with prefix 2 and the desired tens and units digits, is dialed, dial tone being removed when the first digit is dialed. The station may dial rotary dial pulses or multifrequency tones. When the station is rotary dial, the dial pulses are applied to the register via the line circuit and the processor. When station signalling uses pushbutton MF tones, the multifrequency tones are applied to the register via the line circuit, a first originate path of the common highway and a second terminate path of the common highway. The register counts the dialed information and applies the information, in binary form to the processor and the memory. When the dialed number is received, the processor, using status information from the called line circuit determines that the line is free. The processor transfers control of the call to a free local link, releases the register, and the memory stores the calling and called station numbers in the time slot allocated to the local link.

During the time slot allocated to the local link: The called station units and tens outputs of the memory enables the ringing circuits of line circuit 12B of station 14B causing interrupted ringing to be applied to the called station. The calling station units and tens outputs of the memory enables the talking path of the calling line circuit, and ring tone is applied to the calling station. Ring tone is connected into the originate path of the common highway by the ring tone enable signal from the processor.

When the called station answers, its off-hook terminator and free/busy signals to the processor cause the ringing to be removed from the called station and the ring tone to be removed from the calling station. At this time the intercom lamps at the calling and called stations will be illuminated. Supervision between the station line circuits is now maintained by the local link.

During the time slot allocated to the local link, the units and tens outputs of the memory for the calling and called stations are applied to the calling and called line circuits respectively. In conjunction with the receive enable signal, the talking circuits of both line circuits are enabled during the one microsecond time slot. Four paths (transmit and receive originate and transmit and receive terminate) of both line circuits are enabled and the power board connects the transmit-originate path to the receive-terminate path and connects the transmit-terminate path to the receive-originate path. Thus, during one microsecond out of every 64 microseconds, the talking paths of the two stations are connected.

When the call is complete, the first station goes on-hook, the other station is locked out and receives busy tone if it does not go on-hook. The processor releases the local link and that time slot is free for another call.

Assume that when the originating station had dialed the desired number, the called station was busy. In this case, the processor would return a busy lockout signal to the line circuit and busy tone would be applied to the calling station.

Assume that the originating station had dialed an unavailable number. In this case, the processor would return an unavailable lockout signal to the line circuit, and reorder tone from the board would be applied to the calling station.

Figure 2:
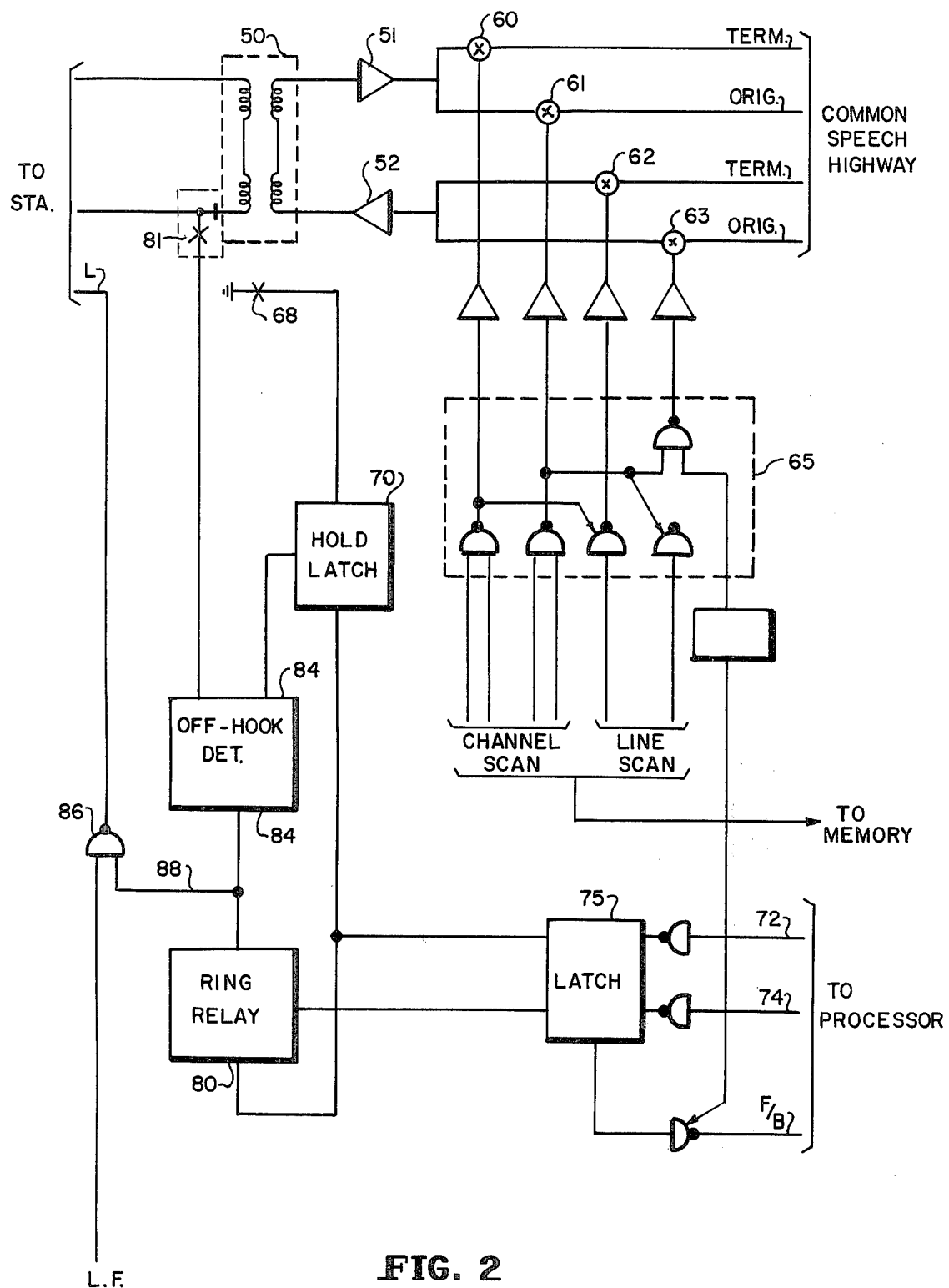
FIG. 2 is a schematic block circuit diagram of a line circuit of FIG. 1.

In FIG. 2, we show a simplified line circuit which performs four basic functions, provides a speech path, provides ring control, provides a constant current talking battery and provides off-hook detection. Included is a hybrid 50 for speech transmission with an amplifier 51 and 52 for each speech path, these being the receive the transmit of the dual highway. The amplifiers, as shown symbolically may be considered to include the PAM multiplexing and demultiplexing as necessary. Each highway has two possible activation paths, one for call origination and the other for call termination. Each activation path is controlled by an FET devcie, these being indicated by an X in a circle. Four FET devices (60–63) are provided, one for each possible path with each FET controlled by a logic network 65, the logic network being responsive to line and channel scan for operating the designated FET during a basic time slot. With an FET activated, contact 68 responsive to the hybrid energization closes a ground path to the hold latch 70 and consequently, latch 75 to mark the line as busy.

On an outgoing call, the calling party goes off-hook in the normal manner. This closed loop condition provides a preliminary enabling signal on lead 72 to enable a line scan lead. When the line scan reaches the line seeking service, the originate FET's are activated for the basic period of the line scan, time slot 64. During the ensuing time frame, an available register is activated and the identification of the calling line is transferred into memory for subsequent use.

On a call coming to a station such as that whose circuit is shown in FIG. 2, first the free or busy FB lead is scanned during the time slot of the register handling the call and on an idle indication returned, the further handling of the call is transferred to the local link circuit during its time slot. During the link time slot over line scan and channel scan leads, the terminate FET's 60 and 62 are activated by logic 65 and provide ringing current to the station.

A start-ring indication is received from the processor over leads 72 and 74 to operate latch 75 and mark the line circuit FB lead as busy. The ring relay 80 is actuated to transfer its contacts 81 to open the hybrid path and to close a path to the off-hook detector 84. A path is completed to gate 86 to provide ringing signals to the L lead and across tip, ring and RT leads.

On the called party going off-hook, detector 84 is activated to cause relay 80 to shut off and remove the input signal over lead 88 to gate 86. Relay 80 on release restores its contacts 81 to remove ring detection and to reclose the talking path.

Figure 3:
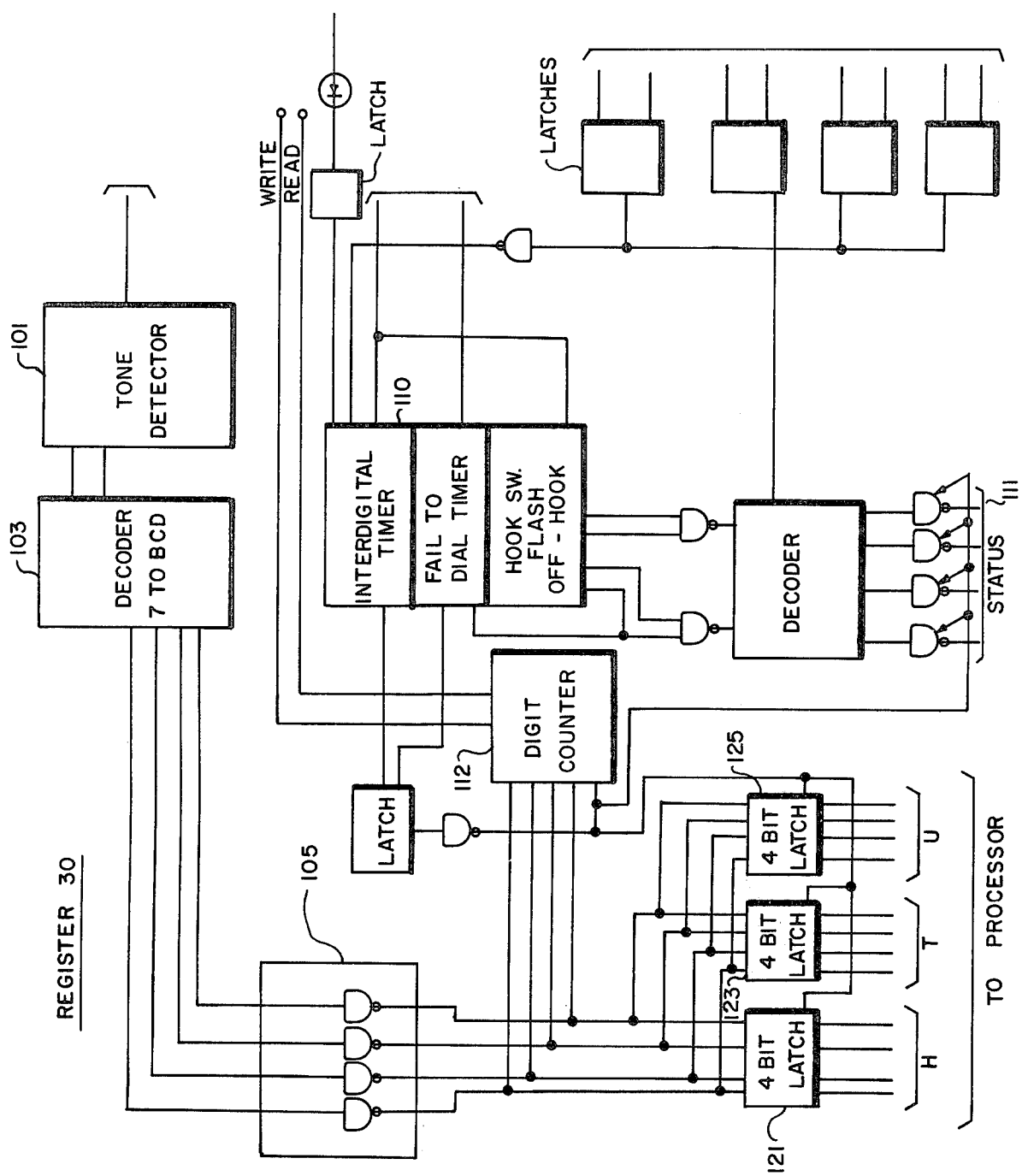
FIG. 3 is a schematic block diagram of the register of FIG. 1.

In FIG. 3, we show in block form a register as used herein. A plurality of registers is provided, each register having a basic time slot assigned to it. One register indicated as having an idle status on leads 111 is allocated to handle a call on receipt of an off-hook signal determined to be a request for service. The register receives dialed digits, stores the digits, performs a busy test on the called line, and if the line is busy provides an indication to the processor so that a busy tone may be returned to the caller. The register is then free to release. If digits are not dialed within a predetermined time limit, the call is terminated. If the called line is not busy, the allocation of handling the call is passed on to the local link by the processor.

To perform these functions, the register 30 of FIG. 3 includes a multi-frequency tone detector 101 to validate and accept keyed digits. These digits are decoded in decoder 103 to binary coded decimal form (BCD) for passage through inverter gate stage 105. On receipt of dialed digits, timer 110 times the interdigital pause, and the digits are counted in counter 112. In either case, digits are passed to separate four-bit latches 121, 123 and 125 for hundreds, tens and units respectively, for executing a busy test on a called line. The status of the FET controlling logic of the line circuit of the called line is checked on the FB lead. When the FB lead indicates the line is idle, the call is transferred by the processor to the time slot of an available local link if a local call is indicated. If a trunk is called, the operation of the processor circuit is similar to transfer the call to a trunk time slot following receipt of the first or hundred digit 9.

Figure 4:
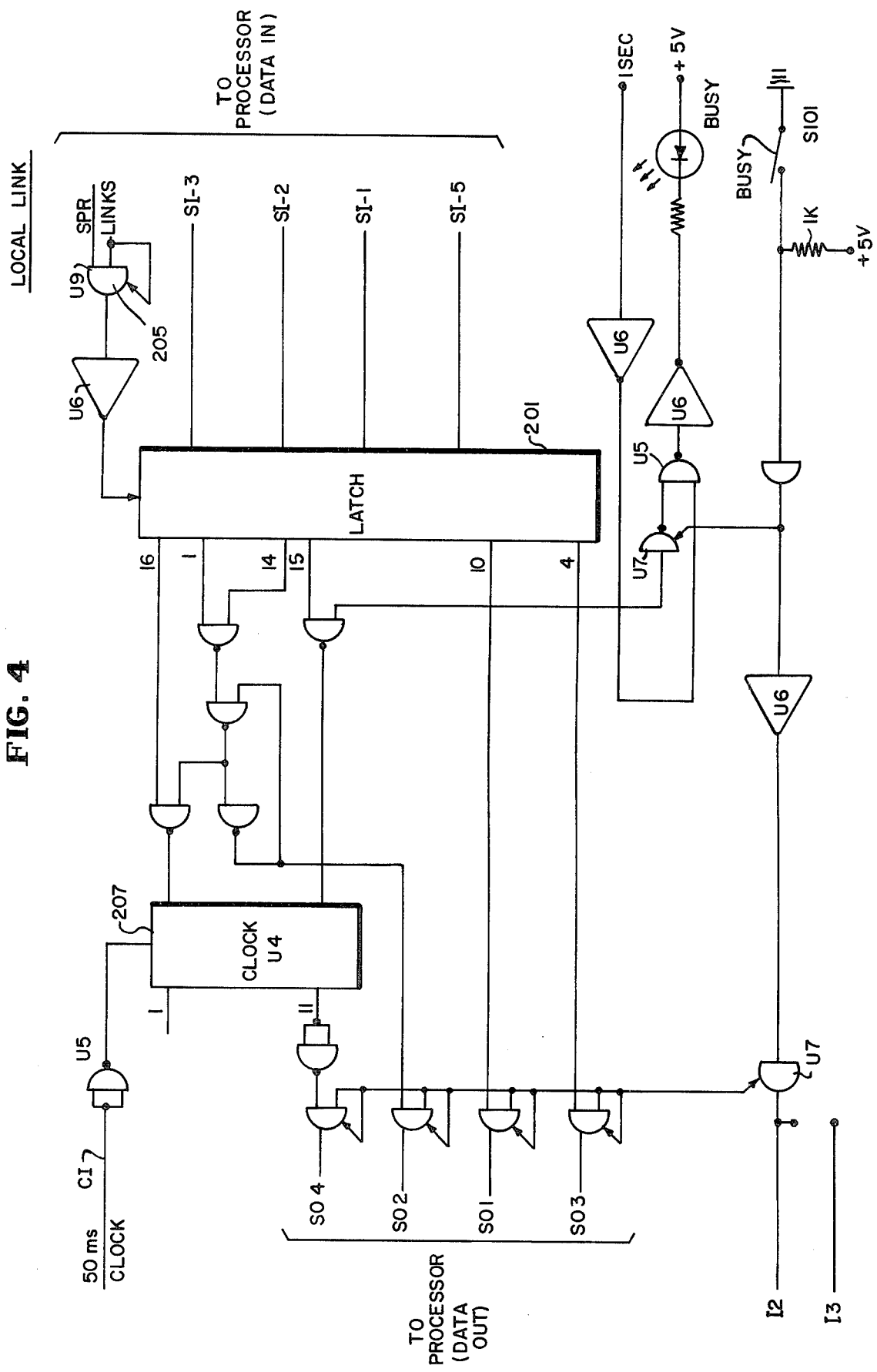
FIG. 4 is a detailed circuit of a local link circuit of FIG. 1.

The local link 16 of FIG. 4 provides supervisory control for a local call through the ringing and conversation stages. As mentioned previously, each link of the plurality available is provided with a separate time channel. A called line is tested for a busy condition by the register prior to transfer to control by the link, and a link is only called into operation when the called line is found to be idle. Thus, the call is transferred from the register in use to a link by seizing an available link over data input lead SI-1. The link when seized is latched by latch 201 and the data input leads SI-2 and SI-3 are connected to th called line through processor 42 over data out leads SO-1 and SO-4 to memory and the called line circuit.

Gate 205 of the link is pulsed by the processor to gate data in, the signals being coincident with clock-generated signals received over lead C1 to internal clock 207 to gate the signals between the calling and called line. Off-hook sensing is performed over leads SI-2 and SI-3 for supervising calls in process.

Figure 5:
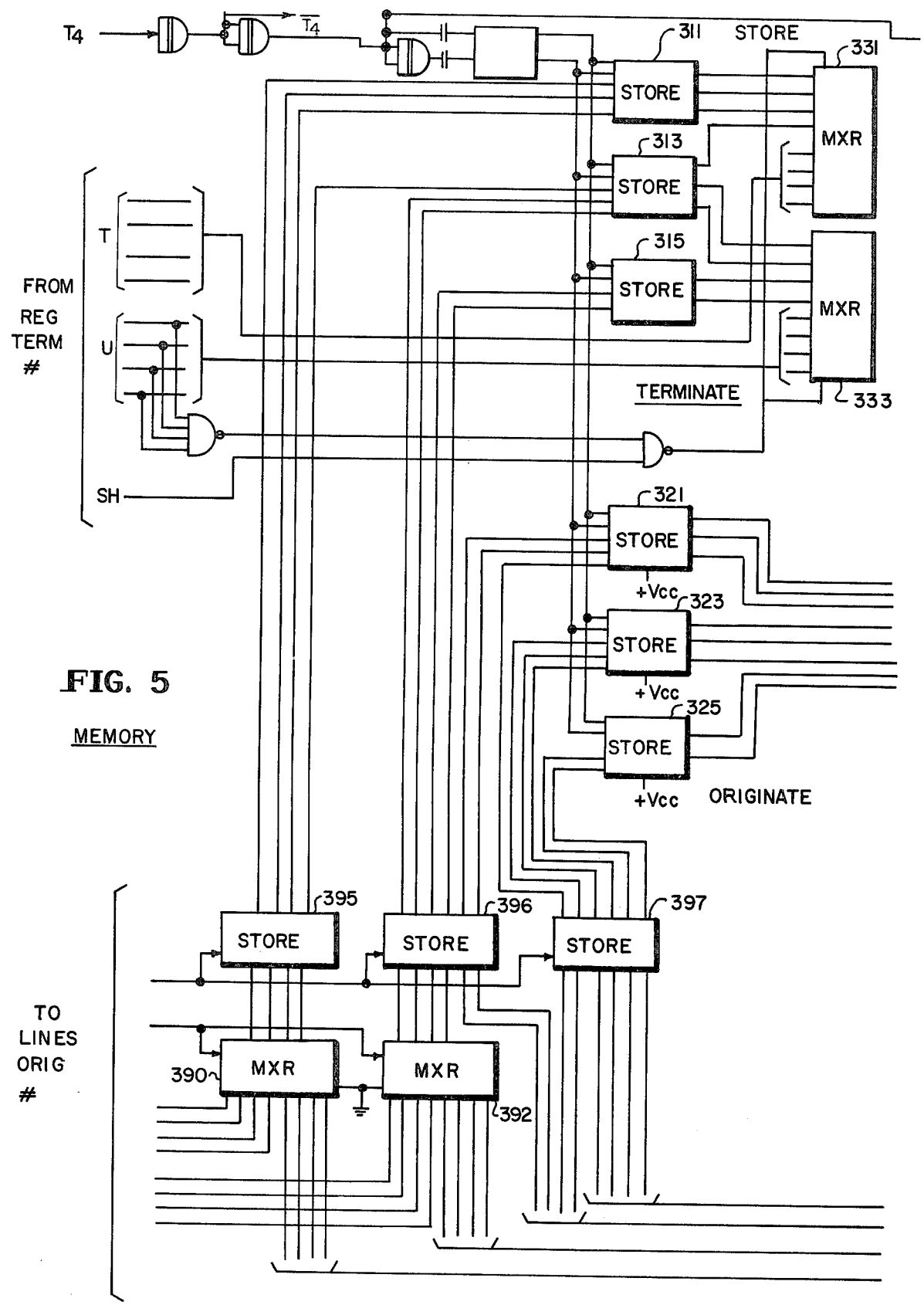
FIGS. 5–7 form a schematic circuit diagram of greater detail of the recirculating memory of FIG. 1.
Figure 6:
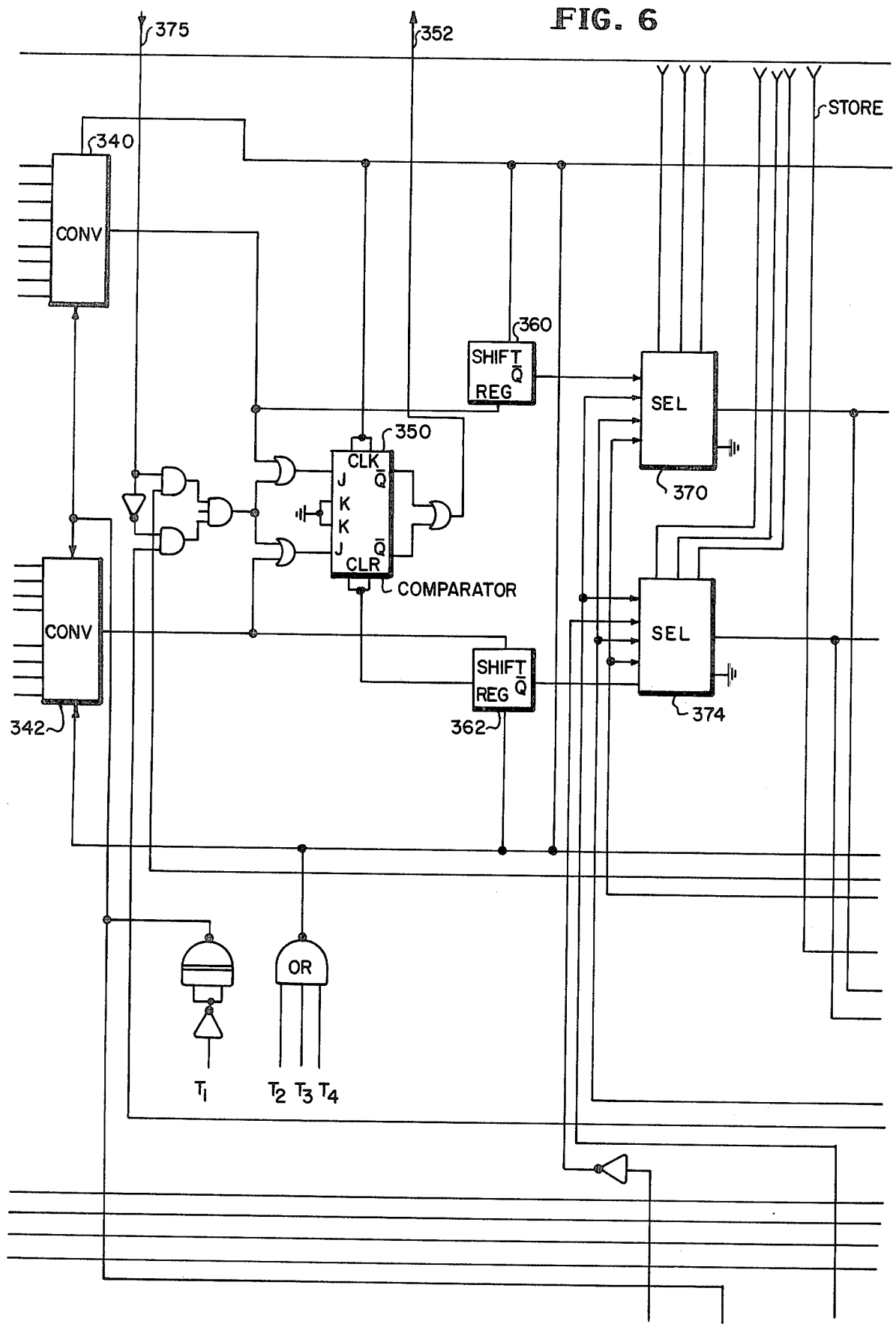
Figure 7:
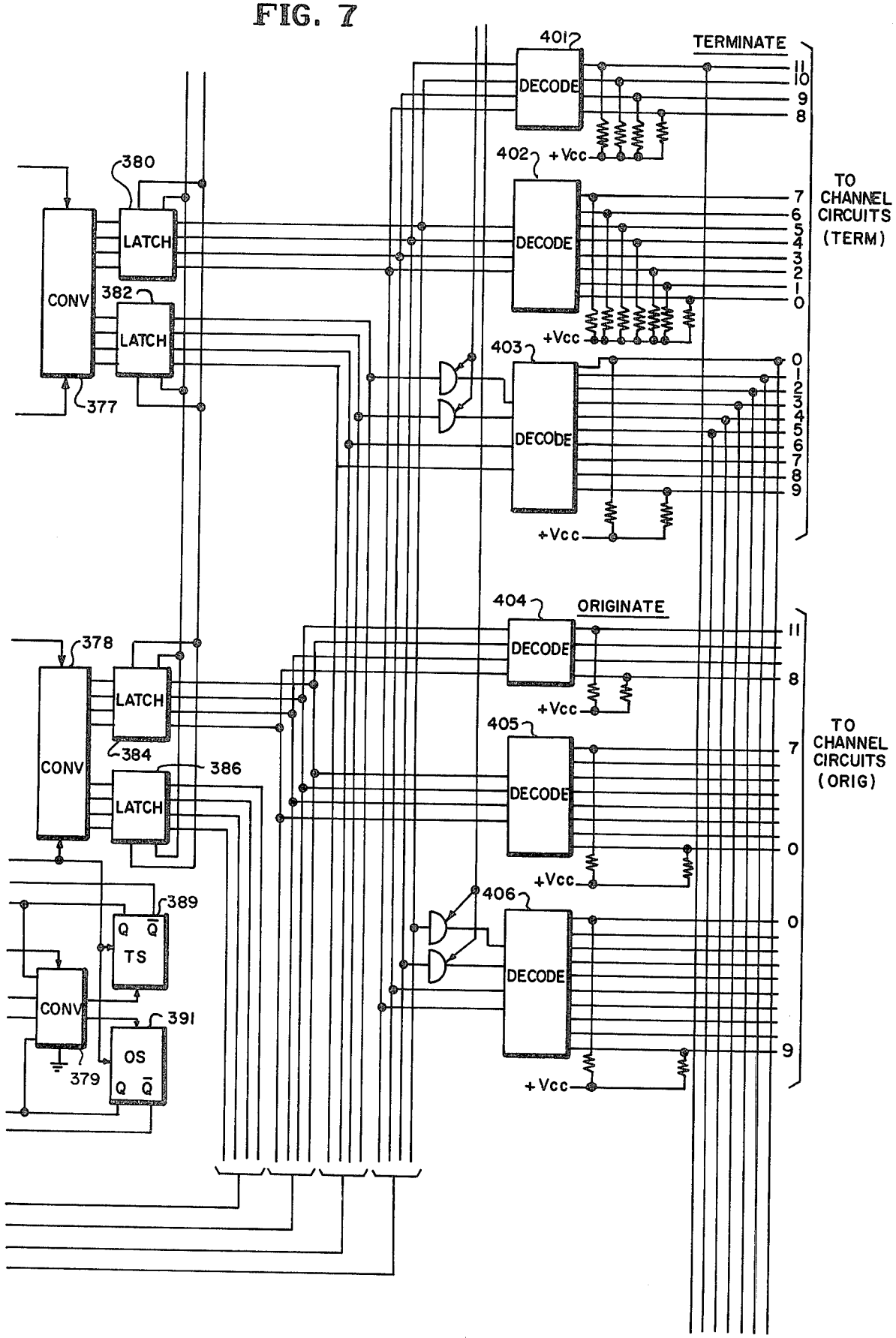

The memory of FIGS. 5–7 comprises a 64-bit shift register, sixteen bits wide to provide for each channel, memory of both the originating and terminating numbers. The upper portion of the circuit of FIGS. 5–7 comprises the terminate station data section while the lower portion comprises the originate station data portion, the portions being virtually identical one to the other. This memory shift register has 60 circulating shift stages of memory and has four operative final stages, one for transferring in or the writing of data for processing, a second for processing data, a third for decoding data and a fourth for writing in data for the next frame or cycle. These areas may be seen in FIGS. 5–7 as designated across the top of the figures. Thus, the memory of FIGS. 5–7 provides the recirculating control of the channel unit being implemented at each finite time period and the memory acts to time position the four-channel simultaneous activity within the final four stages.

Within the memory, the storage area comprises terminating station data stores 311, 313 and 315 and originating number data stores 321, 323, and 325, the calling or originating station numbers and the called station or terminating numbers being stored in coded form in the stores. Information passes through a plurality of coding stages. Terminating station information from the stores in multiplexed withn two to one multiplexer stages 331 and 333. Digital information in both terminating and originating stores is converted within respective parallel-to-series converters 340 and 342 within the start of the writing stage for subsequent processing of the serial data. Information from the particular channel whose basic time period has arrived are first converted within stage No. 1 to serial data. This serial data is then transmitted to stage No. 2 for processing. This step comprises the comparison of stored station numbers with numbers stored in the individual channel coupled circuits such as links, etc. This comparison is performed continuously to determine whether transfer to another channel is necessary.

The comparison of stored addressed within a line or trunk and that of a station stored in the memory as being involved in the call provide the basis of the call processing function. The output of comparator 350 of the comparison stage is transmitted on lead 352 to the processor (FIG. 11), as will be explained. The processing stage as initiated by the comparator 350 occurs during the time period next after the basic time period for a channel.

Serial information from converters 340 and 342 is fed to shift registers 360 and 362 during the processing period for each channel. Within this time period, data passed down the recirculating memory is decoded within selectors 370 and 372. In this stage, any new station numbers to be inserted into a time channel are entered into the memory for decoding and subsequent storage in the memory over a path from lead 375 from the processor through the comparison stage to selectors 370 and 372. Data is decoded or re-encoded in selectors 370 and 372 and series-to-parallel converters 377, 378 and 379. The data is subsequently coded, written and stored in latches 380, 382, 384, 386, 389 and 391 for recirculation to the memory through multiplex stages 390 and 392 by way of stores 395, 396 and 397.

Figures 8, 9:
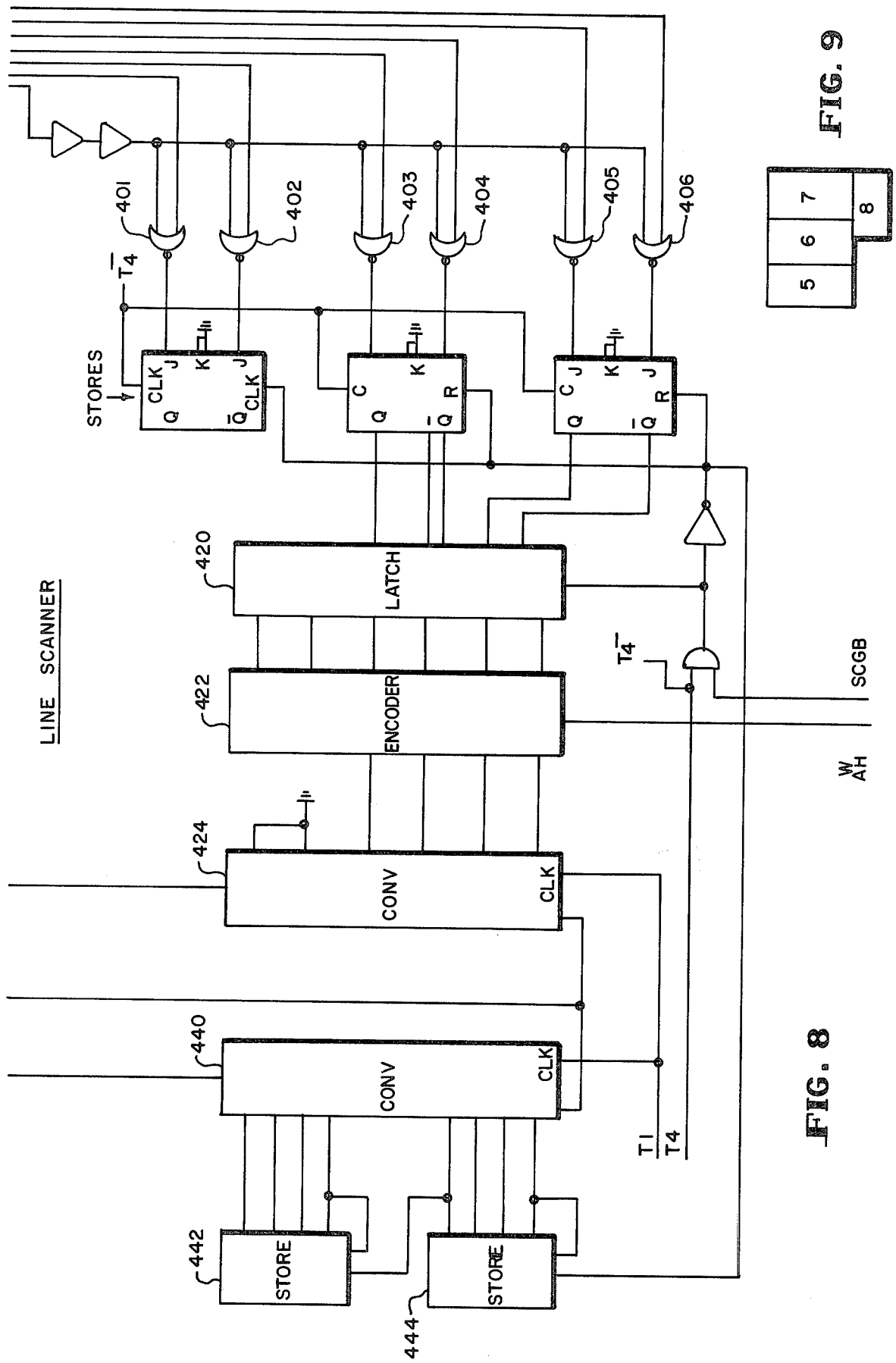
FIG. 8 is a schematic circuit diagram of the line scanner of FIG. 1.
FIG. 9 is a block diagram showing of the location of FIGS. 5–8 relative to one another.

FIGS. 7 and 8 also include the line scanner. As mentioned, the line scanner is activated once for each frame or cycle of the memory scan. First of all, the line decoders 404–406 of the line scanner are enabled to enable the particular line circuit being scanned during the particular time period for call origination. Decoders 401–403 provide the terminating line circuit decoding. The line being scanned is incremented by one from the line circuit scanned during the preceding line scan period.

The line circuit enabling is accomplished by converting the number of the line circuit being checked from BCD form into decimal form with one line circuit being enabled by a combination of energization of its tens and units digit leads. The line scan is effected by scanning of the logic controlling originate FET's of the line circuit for their condition and thereafter ascertaining that no busy signal is present on the FB lead. The coincidence of these conditions (1) render the FET's of the originating line circuit conductive, and (2) determine that there is no busy signal on the FB lead. Then the line considered to be calling has its number stored in stores 395–397 (FIG. 5) for transfer to an available digit register during the time period of an available register during the next frame.

Figure 11:
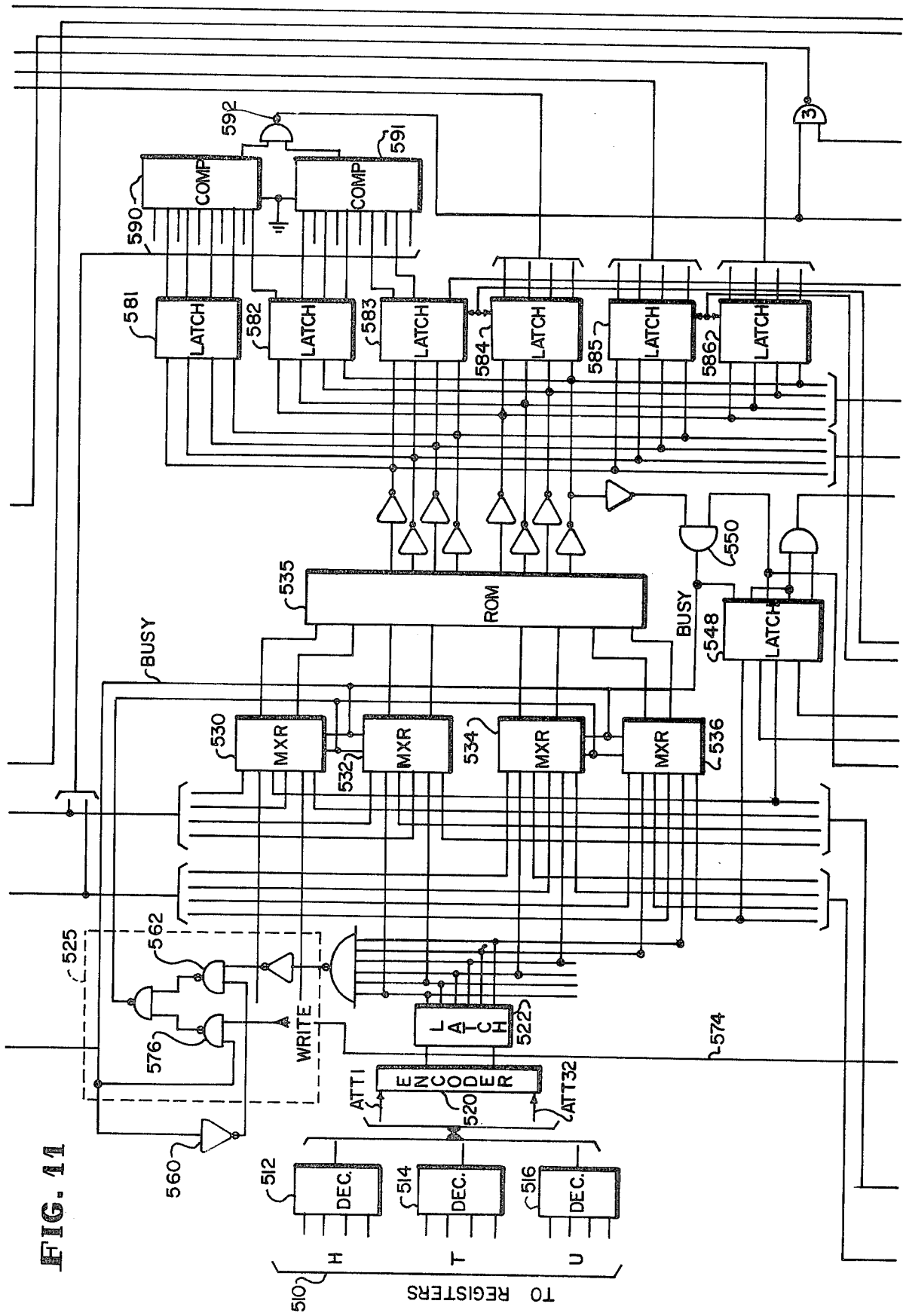
Figure 10:
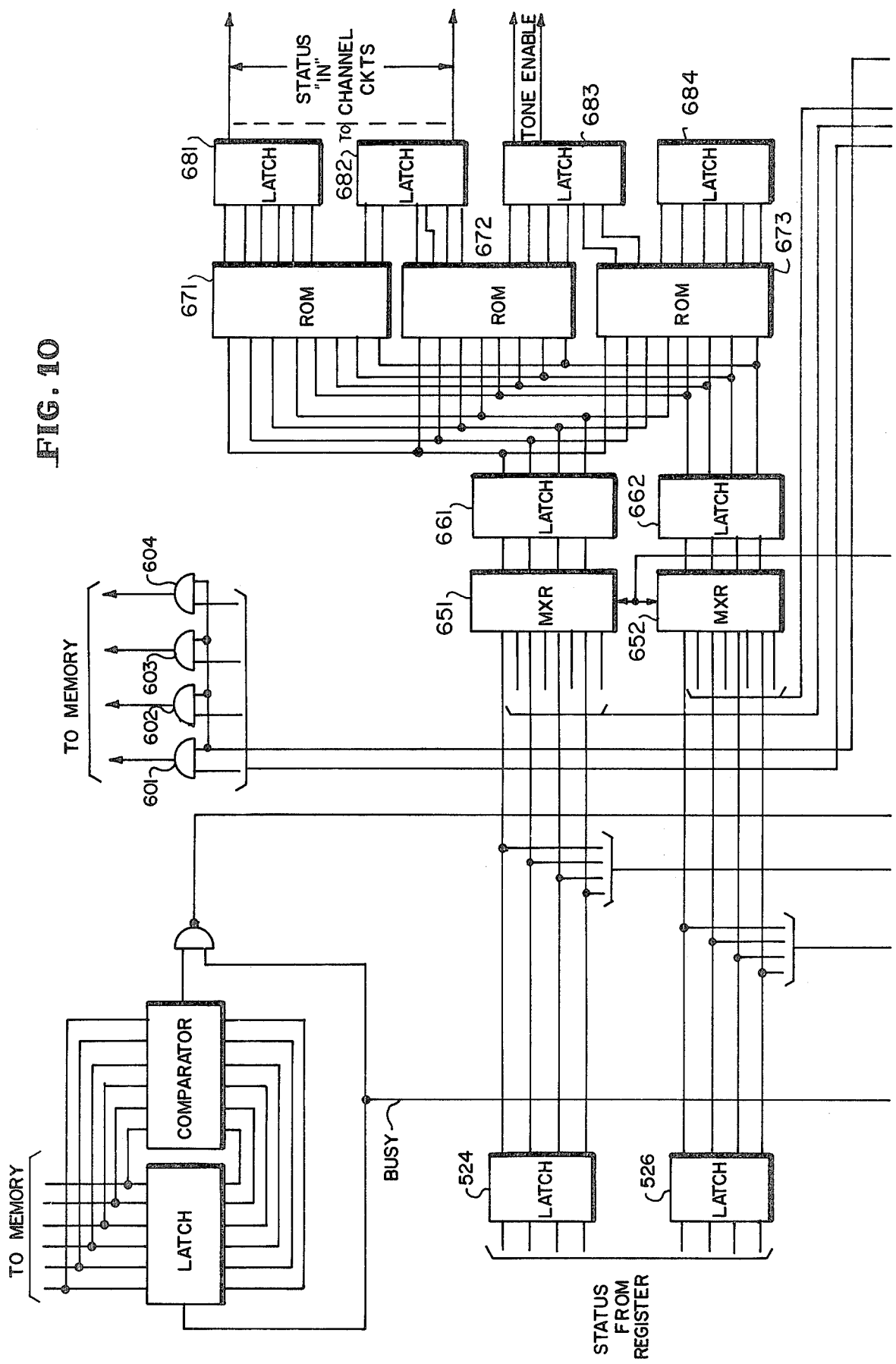

The processor 42 is shown in detailed form in FIGS. 10–12. The processor provides the functions of decoding call control information from channel visits such as the register, and routing the call in conjunction with the information received from the channel unit.

The processor is involved during a change of status condition when logic and next step control are necessary. Further, the processor provides enabling for transmission of tones to lines involved in a call. The processor determines when a transfer to another time slot is indicated and performs that transfer.

The processor of FIGS. 10–12 analyzes received information for call routing and for selection of suitable channel circuits responsive to input conditions, and for the transfer of control data concerning the calling and the called station to the memory area of the channel section to which control is being transferred.

Information is fed into the processor each microsecond or channel time slot even if nothing is happening, the feeding of information being for the determination as to whether processing is necessary or not.

The processor may be considered as having four stages coincident with the four stages of the memory. Thus information is read or transferred in during one time slot, processed during the next time slot, decoded during a second processing step and written again into the memory during the fourth stage.

The following processor description is premised on the usual numbering arrangement used in telephony, i.e., the number zero as the first digit (in this instance, the hundreds digit) denoting a call to an operator, the first digit 9 indicating an outgoing trunk call, the first digit 8 indicating a tie line call, and the first digit 2 denoting a local call. Thus, the processor receives a signal from the register as to the first digit dialed and causes a function circuit of the desired type to be transferred to control of the call in question.

The processor is connected to receive call routing information from the register in the form of the number of the called or terminating station. This number is received on leads H, T and U noted as 510 at the inputs to four to ten line decoders 512, 514 and 516. The outputs of these decoders are encoded in a thirty-two line to five-line encoder 520, the five data lines being transmitted into six-bit latch 522 for temporary storage. Concurrently with the dialed data, status and identity information from the registers is received on the two, four-bit latches, 524 and 526.

The output of latch 522 passes in parallel to logic network 525 for enabling purposes, and to the four-to-one multiplexers or pre-encoders 530, 532, 534 and 536 within the data processing stage. The multiplexed information is then transferred to the programmable read only memory 535. Memory 535 is an integrated circuit unit of the type manufactured and sold by many manufacturers of such electronic circuits under the general class of programmable read only memory (PROM). This memory as programmed, provides a decoding data for comparison with status and identity information from the channels through latches 524 and 526. The decoded output is forwarded to latches for comparison with data from the channels. Thus, when there is a positive comparison between the coded information from the PROM and from the channel unit being processed, the call is transferred to that channel unit or function circuit for control of the call.

In the event that the processor has a transfer in process and is awaiting the time slot of a function circuit for handling that call, the data of the call being transferred is stored in latches 582 and 583 awaiting the comparison. Other signals received from function circuits will pass unprocessed through memories 601–604 for rewriting in the memory during the properly addressed time slot. Rewriting through this path provides an indication that the processor will handle the call transfer during a subsequent cycle. If information being processed is incapable of being processed, such as errors, excess noise, ets., the processor will make four attempts to process the data. The information is stored during those four cycles and will be cancelled as invalid information at the end of four cycles.

Class of service information is forwarded to multiplexers 540 and 542 for encoding and pre-selection along with information for vacant number intercept. This information is also sent to a read only memory 544 and six-bit latch 546 for aiding in the call routing and/or transmission of tones.

From the class of service read only memories 540 and 542, an output is provided to busy gate 550 at the output of latch 548, the busy signal path being traceable through amplifier 560 to gate 562 of logic network 525. This path is used to enable busy signalling. The output of logic network 525 is fed to multiplexers 530 and 534. A further output of memory 544 is fed to flip-flop 570 and decoder 572. A second output from flip-flop 570 may be traced on write lead 574 to gate 576 of logic 525.

The output of memory 535 is fed to the latches 581–586, for call processing. The output of latches 581–583 is fed to comparators 590–591 to control the transfer during the first processing period through NAND gate 592 to the memory over gates 601–604 for writing of information in the memory. From the decoder 572, other output leads are connected to latches 611, 612 and 613 to provide search control, write number control and write status control respectively through gates 621–626 in conjunction with clock pulses received over lead CLK at the input to gate 625.

The output of read only memory 544 is sent in parallel with its inputs to latch 546 to parallel multiplexers 631 and 632 for comparison and output over inverter gate 634 to latch 548.

For tone transmission, such as dial tone, busy tone, ringback tone, a path may be traced from the register through pre-coding stage comprised of multiplexers 651–652 and latches 661 and 662 to the second processing stage of programmable read only memories 671, 672 and 673 and latches 681–684 to provide tone enabling signals for operating sources of the necessary tones as mentioned previously.

Speech and audio tones are transmitted to the line circuits in time division form and are modulated by a PAM network into audio signals. The audio signals are forwarded to the station from the line circuit in the normal manner.

We claim:

1. A telecommunications exchange comprising a central control including a processor and a memory, and a plurality of stations; said memory comprising means for storing numbers of a calling one of said stations and a called one of said stations, said storing means comprising a recirculating memory having as its capacity a first predetermined number of memory areas with each memory area comprising storage for calling and called station numbers, means operative with one of said memory areas for transferring memory information for processing by said processor, means in said processor responsive to input information received from a calling station for enabling routing a call in conjunction with data from a second memory area, and means in a third memory area for again storing call data in said memory for recirculation.

2. An exchange as claimed in claim 1, wherein there are a plurality of circuits peripheral to said central control for controlling functions of calls through the exchange, and in which each of said memory areas comprises a time separated channel, and in which said function control circuits are each allotted one of said channels for performing its control functions.

3. An exchange as claimed in claim 1 wherein said exchange uses time division principles for signalling control through said processor, and said time division includes a plurality of time slots in a recurring frame for circulating call processing information in parallel form through said memory and processor.

4. An exchange as claimed in claim 3, wherein there are a plurality of registers and local link circuits and one of said time slots represents each of said registers and other of said time slots represents each one of said local link circuits, and means responsive to data from said calling station for storing information in the register corresponding to the called and calling station information and for means responsive to said stored data for testing the calling station for a busy condition.

5. An exchange as claimed in claim 3 wherein the last of said plurality of time slots in each frame comprises a time period for scanning lines of said exchange seeking service.

6. An exchange as claimed in claim 4, wherein said processor includes means for transferring control of said call from the time slot representing said register to the time slot representing said local link responsive to the called station being found idle in said testing.

7. An exchange as claimed in claim 4 wherein there are a plurality of call processing circuits peripheral to said processor and coupled thereto over a multiple conductor highway, each of said processing circuits represented by different ones of said time slots, and each of said processing circuits operative during a plurality of time slots in addition to the time slot represented thereby.

8. A time division telecommunications exchange wherein there are a plurality of time channels comprising a time frame, a plurality of circuits for supervising exchange functions with each of said channels representing a separate one of said function circuits, means operative during each time channel for storing calling and called line data on calls being handled by the associated function circuit, line scanner means operative at the conclusion of each time frame to scan one line for call service request, a register comprising one of said function circuits, means operative during the time frame subsequent to a line scan finding a line seeking call service for associating said register with said seeking line, means in said register for receiving dialed digits from the calling line for identifying a called line, means in said register for testing the called line for availability, and a central processor responsive to a called line being found available on said testing for transferring the call being serviced from said register to a further function circuit.

9. An exchange as claimed in claim 8, wherein said central processor includes a recirculating memory, plural storage areas in said memory, each storage area comprising means for storing data in parallel on a calling line seeking service, a line being called and the status of the call between the calling and called lines.

10. An exchange as claimed in claim 8, wherein said processor comprises means for decoding information received from said register indicating the called line being available to a code designation representative of a link circuit, and further includes means in the processor for transferring the call being serviced to a link circuit responding to the code designation.

11. An exchange as claimed in claim 8, wherein each line is coupled to a line circuit, each line circuit coupled to said exchange by a receive highway and a transmit highway, and each of said highways includes an originate control lead operative with said line being a calling line and a terminate control lead operative when said line is a called line.

12. An exchange as claimed in claim 11, wherein there is an individual control FET in a line circuit for each of the leads coupled to the exchange therefrom.

* * * * *